US012659862B2

(12) United States Patent
Paris et al.

(10) Patent No.: US 12,659,862 B2
(45) Date of Patent: Jun. 16, 2026

(54) LOW POWER-WAKEUP SIGNAL FEEDBACK FOR WIRELESS NETWORKS

(71) Applicant: NOKIA TECHNOLOGIES OY, Espoo (FI)

(72) Inventors: Stefano Paris, Vanves (FR); Knud Knudsen, Aabybro (DK); Jorma Johannes Kaikkonen, Oulu (FI); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 534 days.

(21) Appl. No.: 18/171,318

(22) Filed: Feb. 17, 2023

(65) Prior Publication Data

US 2024/0284330 A1     Aug. 22, 2024

(51) Int. Cl.
| | |
|---|---|
| *H04W 52/02* | (2009.01) |
| *H04L 5/00* | (2006.01) |
| *H04W 72/23* | (2023.01) |
| *H04L 1/1812* | (2023.01) |

(52) U.S. Cl.
CPC ....... *H04W 52/0229* (2013.01); *H04L 5/0055* (2013.01); *H04W 72/23* (2023.01); *H04L 1/1812* (2013.01)

(58) Field of Classification Search
CPC ............. H04W 52/0229; H04W 72/23; H04W 52/0235; H04W 52/028; H04W 52/0216; H04L 5/0055; H04L 1/1812; Y02D 30/70
USPC ........................................................ 370/311
See application file for complete search history.

(56) References Cited

U.S. PATENT DOCUMENTS

| | | | |
|---|---|---|---|
| 2018/0020405 A1* | 1/2018 | Huang .............. | H04W 52/0229 |
| 2020/0022081 A1 | 1/2020 | Ljung et al. | |
| 2021/0321446 A1 | 10/2021 | Lee et al. | |
| 2021/0392584 A1 | 12/2021 | Reial et al. | |
| 2022/0086756 A1 | 3/2022 | Reial et al. | |
| 2022/0116875 A1* | 4/2022 | Nimbalker ........ | H04W 52/0216 |
| 2022/0182943 A1 | 6/2022 | Maleki et al. | |

OTHER PUBLICATIONS

3GPP TSG RAN meeting #94e, RP-213645 (revision of RP-213593); "New SID: Study on low-power Wake-up Signal and Receiver for NR"; Source: Vivo; Agenda: 8A.1; Electronic Meeting, Dec. 6-17, 2021; 4 pages.
3GPP TSG RAN Rel18 Workshop, RWS-210168; "Motivation for new study item on ultra low power wake up signal in Rel 18"; Source: Vivo, Spreadtrum Communications; Guangdong Genius; Agenda Item: 4.3; Electronic Meeting, Jun. 28-Jul. 2, 2021; 14 pages.
3GPP TSG RAN WG1 #111, R1-2211032; "Discussion on physical signal and procedure for low power WUS"; Source: Vivo; Agenda Item: 9.13.3; Toulouse, France; Nov. 14-18, 2022; 9 pages.

(Continued)

*Primary Examiner* — Mang Hang Yeung
(74) *Attorney, Agent, or Firm* — Barta Jones, PLLC

(57) ABSTRACT

A technique may include detecting, by a user device, a low power-wakeup signal by a low power-wakeup receiver of the user device received from a network node; enabling a main transceiver of the user device based on the detecting the low power-wakeup signal; and transmitting, by the main transceiver of the user device to the network node, wakeup signal feedback acknowledging the detecting the low power-wakeup signal.

10 Claims, 11 Drawing Sheets

(56)           References Cited

OTHER PUBLICATIONS

3GPP TSG RAN WG1 #111, R1-2212419; "Nordic Semiconductor ASA"; Source: Nordic Semiconductor ASA; Agenda Item: 9.13.3; Toulouse, France; Nov. 14-18, 2022; 9 pages.
Extended European Search Report for European Application No. 23216537.3, mailed on Jun. 18, 2024, 8 pages.

* cited by examiner

Example Wireless Network 130

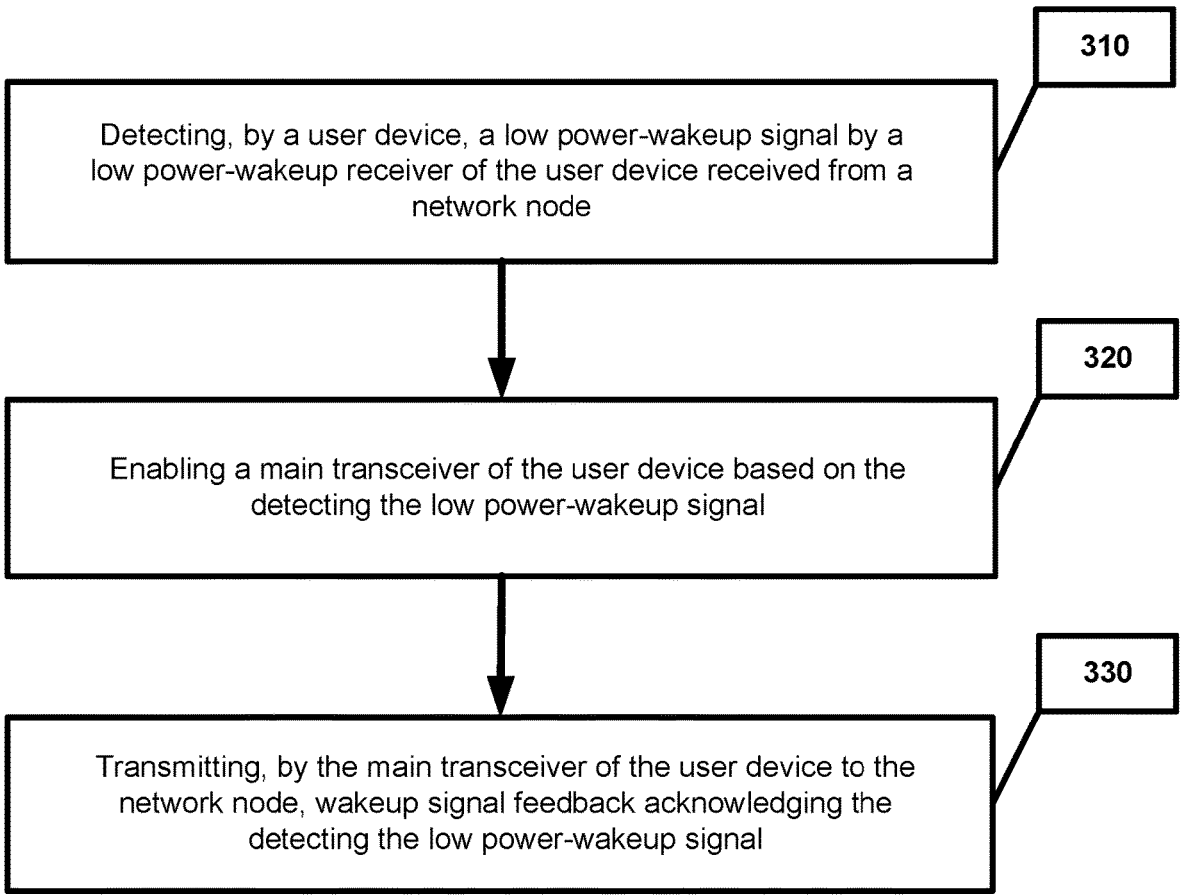

310

Detecting, by a user device, a low power-wakeup signal by a low power-wakeup receiver of the user device received from a network node

320

Enabling a main transceiver of the user device based on the detecting the low power-wakeup signal

330

Transmitting, by the main transceiver of the user device to the network node, wakeup signal feedback acknowledging the detecting the low power-wakeup signal

FIG. 3

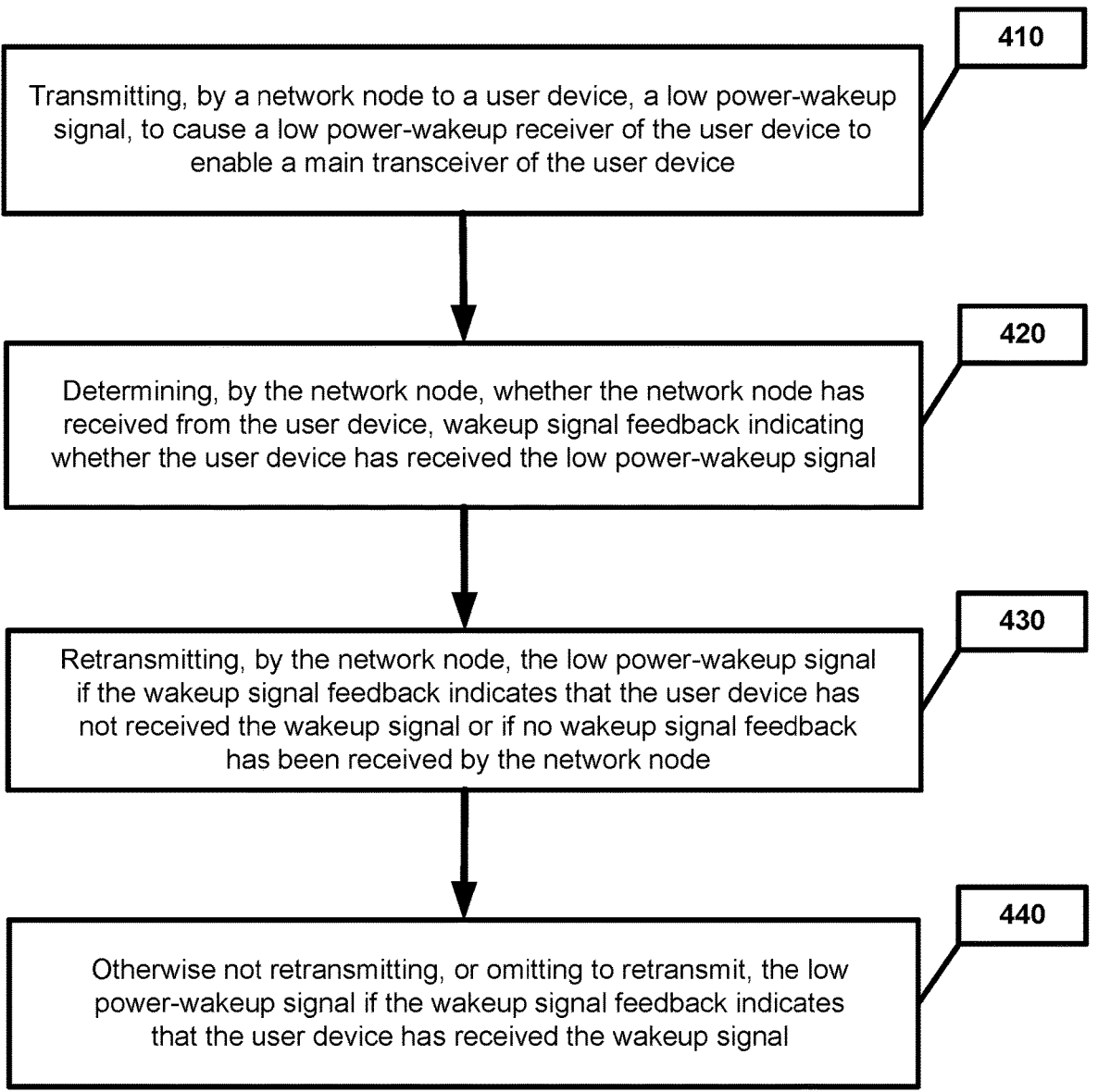

410

Transmitting, by a network node to a user device, a low power-wakeup signal, to cause a low power-wakeup receiver of the user device to enable a main transceiver of the user device

420

Determining, by the network node, whether the network node has received from the user device, wakeup signal feedback indicating whether the user device has received the low power-wakeup signal

430

Retransmitting, by the network node, the low power-wakeup signal if the wakeup signal feedback indicates that the user device has not received the wakeup signal or if no wakeup signal feedback has been received by the network node

440

Otherwise not retransmitting, or omitting to retransmit, the low power-wakeup signal if the wakeup signal feedback indicates that the user device has received the wakeup signal

LOW POWER-WAKEUP SIGNAL FEEDBACK FOR WIRELESS NETWORKS

TECHNICAL FIELD

This description relates to telecommunications systems.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz). 6G wireless networks are also being developed or will be developed in the near future.

In addition, various power saving mechanisms have been introduced, such as discontinuous reception and wakeup signals, to reduce power consumption for mobile devices.

SUMMARY

According to an example implementation, a method includes detecting, by a user device, a low power-wakeup signal by a low power-wakeup receiver of the user device received from a network node; enabling a main transceiver of the user device based on the detecting the low power-wakeup signal; and transmitting, by the main transceiver of the user device to the network node, wakeup signal feedback acknowledging the detecting the low power-wakeup signal.

According to an example implementation, an apparatus includes at least one processor and at least one memory including instructions, the at least one memory and the instructions configured to, with the at least one processor, cause the apparatus at least to: detect, by a user device, a low power-wakeup signal by a low power-wakeup receiver of the user device received from a network node; enable a main transceiver of the user device based on the detecting the low power-wakeup signal; and transmit, by the main transceiver of the user device to the network node, wakeup signal feedback acknowledging the detecting the low power-wakeup signal.

According to an example implementation, an apparatus includes means for detecting, by a user device, a low power-wakeup signal by a low power-wakeup receiver of the user device received from a network node; means for enabling a main transceiver of the user device based on the detecting the low power-wakeup signal; and means for transmitting, by the main transceiver of the user device to the network node, wakeup signal feedback acknowledging the detecting the low power-wakeup signal.

According to an example implementation, a computer program product includes a computer-readable storage medium and storing executable code that, when executed by at least one data processing apparatus, is configured to cause the at least one data processing apparatus to: detect, by a user device, a low power-wakeup signal by a low power-wakeup receiver of the user device received from a network node; enable a main transceiver of the user device based on the detecting the low power-wakeup signal; and transmit, by the main transceiver of the user device to the network node, wakeup signal feedback acknowledging the detecting the low power-wakeup signal.

According to an example implementation, a method includes transmitting, by the apparatus to a user device, a low power-wakeup signal, to cause a low power-wakeup receiver of the user device to enable a main transceiver of the user device; determining whether the apparatus has received from the user device wakeup signal feedback indicating whether the user device has received the low power-wakeup signal; retransmitting the low power-wakeup signal if the wakeup signal feedback indicates that the user device has not received the wakeup signal or if no wakeup signal feedback has been received by the apparatus; and otherwise not retransmitting, or omitting to retransmit, the low power-wakeup signal if the wakeup signal feedback indicates that the user device has received the wakeup signal.

According to an example implementation, an apparatus includes at least one processor and at least one memory including instructions, the at least one memory and the instructions configured to, with the at least one processor, cause the apparatus at least to: transmit, by the apparatus to a user device, a low power-wakeup signal, to cause a low power-wakeup receiver of the user device to enable a main transceiver of the user device; determine whether the apparatus has received from the user device wakeup signal feedback indicating whether the user device has received the low power-wakeup signal; retransmit the low power-wakeup signal if the wakeup signal feedback indicates that the user device has not received the wakeup signal or if no wakeup signal feedback has been received by the apparatus; and otherwise not retransmitting, or omit to retransmit, the low power-wakeup signal if the wakeup signal feedback indicates that the user device has received the wakeup signal.

According to an example implementation, an apparatus includes means for transmitting, by the apparatus to a user device, a low power-wakeup signal, to cause a low power-wakeup receiver of the user device to enable a main transceiver of the user device; means for determining whether the apparatus has received from the user device wakeup signal feedback indicating whether the user device has received the low power-wakeup signal; means for retransmitting the low power-wakeup signal if the wakeup signal feedback indicates that the user device has not received the wakeup signal or if no wakeup signal feedback has been received by the apparatus; and means for otherwise not retransmitting, or omitting to retransmit, the low power-wakeup signal if the wakeup signal feedback indicates that the user device has received the wakeup signal.

According to an example implementation, a computer program product includes a computer-readable storage medium and storing executable code that, when executed by at least one data processing apparatus, is configured to cause the at least one data processing apparatus to: transmit, by the apparatus to a user device, a low power-wakeup signal, to cause a low power-wakeup receiver of the user device to enable a main transceiver of the user device; determine whether the apparatus has received from the user device wakeup signal feedback indicating whether the user device has received the low power-wakeup signal; retransmit the low power-wakeup signal if the wakeup signal feedback indicates that the user device has not received the wakeup signal or if no wakeup signal feedback has been received by the apparatus; and otherwise not retransmitting, or omit to retransmit, the low power-wakeup signal if the wakeup signal feedback indicates that the user device has received the wakeup signal.

The details of one or more examples of implementations are set forth in the accompanying drawings and the description below. Other features will be apparent from the description and drawings, and from the claims.

BRIEF DESCRIPTION OF THE DRAWINGS

FIG. 3 is a diagram illustrating operation of a user device (or UE) according to an example embodiment.

FIG. 4 is a flow chart illustrating operation of a network node according to an example embodiment.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
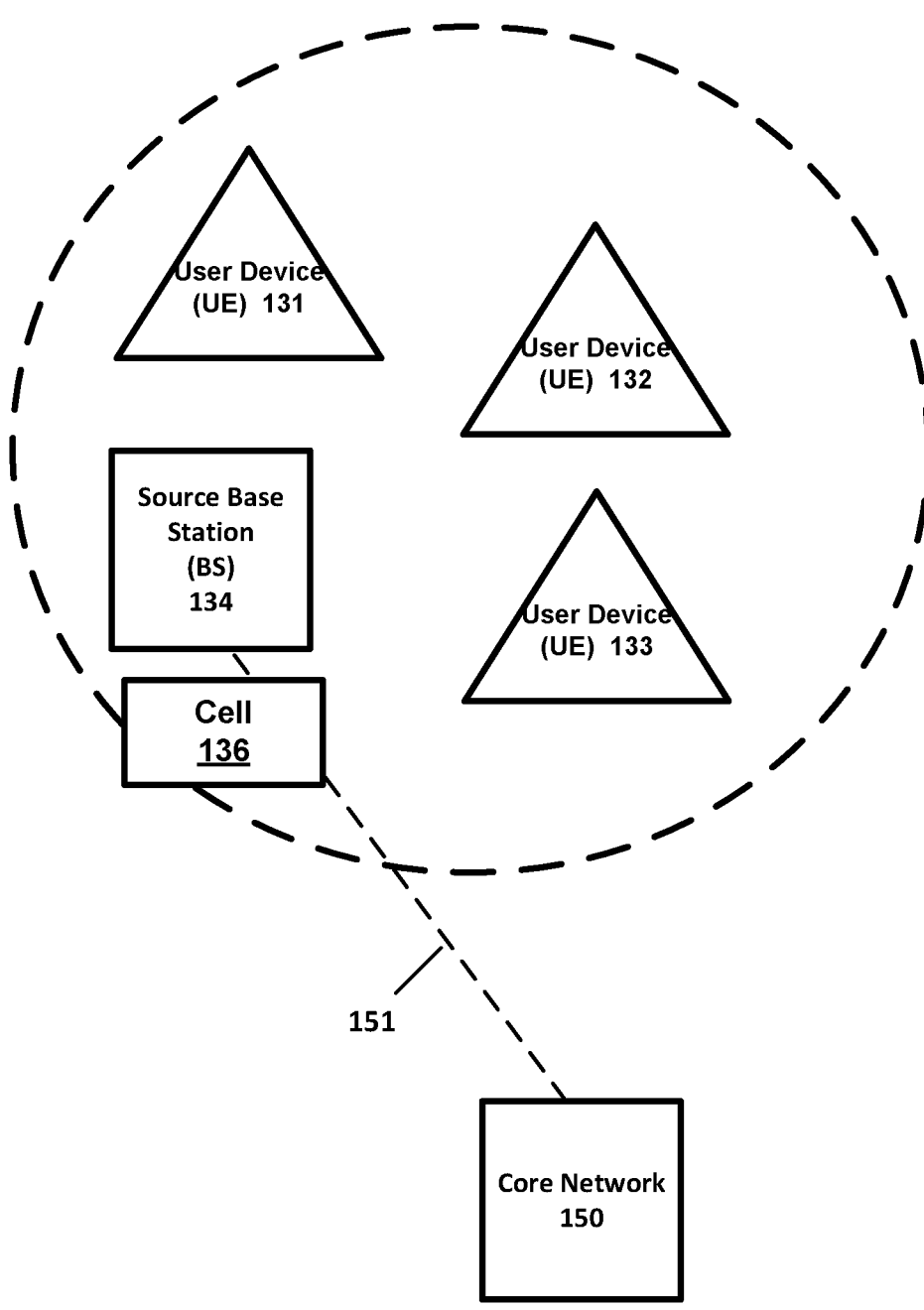
FIG. 1 is a block diagram of a digital communications system such as a wireless network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), 6G, cm Wave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Various power saving mechanisms have been introduced to reduce power consumption for wireless devices, such as discontinuous reception (DRX) and wakeup signals. Many wireless devices or wireless application require both long batter life and low latency. The basis for discontinuous reception (DRX) is a configurable DRX cycle, where the UE monitors for downlink control signaling only when active, sleeping (or in a low power state) with receiver circuitry switched off the remaining time. This may allow for a significant reduction in power consumption. In discontinuous reception, a UE (or user device, wireless device, mobile device), a UE remains in the active state for a certain configurable time after being scheduled and remaining awake until the time expires. Also, release 16 introduces the possibility of a wakeup signal. If the wakeup signal is configured, the UE wakes up a configurable time before a long DRX cycle, checks for the wakeup signal, and if told not to wake up, returns to sleep or low power state for the next long DRX cycle. Checking for a wakeup signal typically requires less power than a complete search for many different DCI (downlink control information) formats and PDCCH (physical downlink control channel) candidates. Together with a shorter duration for checking for a wakeup signal than the long DRX cycle, a reduced power consumption may be achieved when using a wakeup signal.

There are emerging technologies or applications that may require even lower power consumption and low latency. For example, extended Reality (XR) wearables, for example, may be wireless devices that may that at least 99% of the data packets must be delivered with in a packet delay budget of 10 ms or 15 ms (for example), to provide a quality XR experience for the user. Moreover, wearables, such as XR wearables and other small wireless devices, may require even lower power consumption than what has been delivered in the past. Thus, for example, some UE types, such as wearables, actuators, sensors, XR wearables/devices, not only require a long battery life, but also may typically require very low latency.

Figure 2:
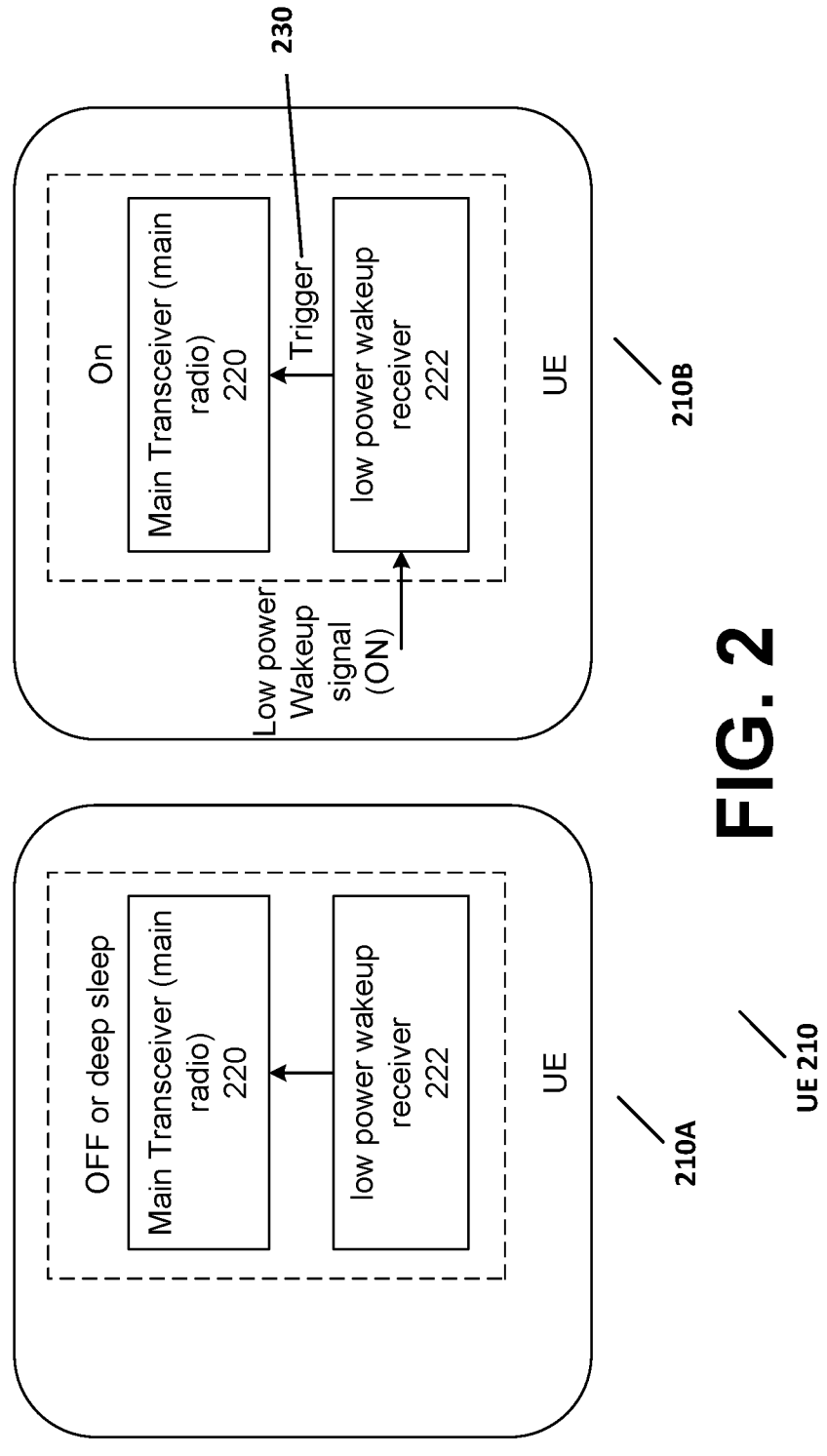
FIG. 2 is a diagram illustrating a UE (or user device) that includes a main transmitter/receiver (main transceiver or main radio) 220 and a low power-wakeup receiver (LP-WUR) 222 according to an example embodiment.

FIG. 2 is a diagram illustrating a UE (or user device) that includes a main transmitter/receiver (main transceiver or main radio) 220 and a low power-wakeup receiver (LP-WUR) 222 according to an example embodiment. UE 210 is shown including two states, including a state 210A where the main transceiver 220 is in an off or low power (or sleep) state, and a state 210B where the main transceiver 220 has been enabled or triggered by the low power-wakeup receiver 222 from the off (or low power or sleep) state to an on state (and thus, main transceiver 220 is in an on state at 210B). For example, the low power-wakeup receiver 222 may use or include hardware that may detect a wakeup signal, while requiring or consuming very little power as compared to other circuitry of the UE. According to an example embodiment, use of the low power-wakeup receiver 222 may be used to reduce overall power consumption for the UE, since the main transceiver 220 may remain in a low power state (e.g., off state or sleep state) until enabled or triggered by the low power-wakeup receiver 222.

At 210A, the main transceiver 220 may be placed in an off state (which may also be referred to as a sleep state or low power state), e.g., based on a sleep schedule or power-saving schedule, or based on an off signal that may be provided by the low power-wakeup receiver 222, for example. Or, the main transceiver 220 may remain in an off state (or low power or sleep state) unless otherwise enabled or activated by the low power-wakeup receiver 222. For example, the low power-wakeup receiver 222 may typically operate in an on state, and may detect a low power-wakeup signal (WUS or LP-WUS) from a network node or gNB. Upon detecting (e.g., receiving and/or decoding, or otherwise detecting) a low power-wakeup signal (LP-WUS) received from a network node or gNB, the low power-wakeup receiver 222 may output a trigger or enable signal 230 to cause the main transceiver (main radio) 220 of the UE to turn on or transition from the off state (or low power state or sleep state) to the on state. Thus, for example, the main transceiver 220 of the UE may generally or typically remain in an off (or sleep or low power) state for power saving, and the main transceiver 220 may be activated or enabled only upon the reception of the low power-wakeup signal from the network node that is detected by the low power-wakeup receiver 222 (as shown at state UE 210B of FIG. 2). Thus, for example, the network node or gNB may trigger (or cause) the UE to wakeup exactly when needed in an event-driven manner, by transmitting a special low power-wakeup signal (WUS) to the UE, which is monitored (and detected) by the low power-wakeup receiver (or WUS receiver) at the UE.

Thus, when the UE 210 receives the WUS, the low power-wakeup receiver 222 triggers or enables the main transceiver 220 (or causes the main transceiver 220 to wake up or transition to the on state) and communication can start. After the main transceiver 220 has been enabled or powered on, the main transceiver 220 may, for example, receive downlink control information (DCI) that may include uplink and/or downlink scheduling information for the UE, and/or may begin receiving data and/or transmitting data in accordance with the scheduling information received via the DCI, for example. Typically, the low power-wakeup receiver 222 is capable of receiving or detecting the wakeup signal, and is typically unable to receive other information (such as DCI and/or data) or transmit control signals or data to the network node. Thus, for example, the main transceiver 220 will typically need to be enabled or turned on by the low power-wakeup receiver 222 before these activities may be performed by the UE (receiving DCI and/or sending and/or receiving data). The DCI may be received via a physical downlink control channel (PDCCH). Thus, after being enabled or turned on, the main transceiver may monitor the PDCCH for downlink control information (DCI) for scheduling information for the UE, for example.

Thus, for example, the main transceiver (or main radio) 220 may be kept or maintained in an off (or sleep or very low power) state to enable higher power saving, a delay needs to be accounted between the reception of the LP-WUS based indication (received with the LP-WUR) and the start of the PDCCH monitoring by the MR (after the full MR reactivation). Thus, we can observe that the use of LP-WUS/WUR introduces an extra-delay for the packet delivery over the air interface, since a certain period of time is required to activate the MR and the UE cannot be scheduled during this period because the PDCCH cannot be received by the UE. The amount of time to fully activate the MR depends on the sleep state in which the MR is kept, and can account for several milliseconds. In some cases, for example, the ramp-up period (i.e., the time to fully activate the MR radio) may be equal to approximately 2 ms, while the delay could be slightly longer (the exact delay may be based on the UE hardware (HW) capability).

However, some problems or challenges may exist with respect to this arrangement that includes a low power-wakeup receiver and a main transceiver. First, an extra delay at the UE is caused by the low power-wakeup receiver (LP-WUR) detecting the low power-wakeup signal (LP-WUS), and then triggering or enabling the main transceiver, and then waiting for the main receiver to turn on. For example, in some cases, LP-WUS introduces 2 ms of extra-delay for the packet delivery due to the ramp-up of the main transceiver triggered by the WUS-reception. For example, if DCI and/or downlink data is transmitted by the network node and arrives at the UE before the main transceiver of the UE is on (enabled), the UE will not receive or decode such control information or data.

In addition to the extra-delay, the loss of LP-WUS signal (LP-WUS detection failure) cannot be directly detected by the network. Therefore, the loss of the LP-WUS signal results in the loss of the following scheduling DCI command and data transmitted by the network node, since the UE failing to detect LP-WUS, will not switch on the main transceiver, and in turn the main transceiver is unaware (does not detect or decode) of the associated PDCCH and PDSCH transmissions. The network can still detect that something wrong happened due to the missing HARQ feedback from the UE for such data transmission. The missing HARQ can be caused by a loss of either LP-WUS (on dedicated channel), or the loss of the DCI (on PDCCH), or the failure in HARQ feedback reception, which may be more rare. As the loss of LP-WUS is indistinguishable from loss of PDCCH (no HARQ feedback is sent in both cases), thus network would need to take the worst case assumption and re-transmit the LP-WUS first, and wait for the main transceiver activation delay, prior to retransmitting the data again.

Thus, for example, some example challenges or problems that may arise, or may be introduced by WUS for delay-critical services like XR applications, may include, by way of illustrative example: 1) LP-WUS introduces an extra delay of the data transmission; and 2) LP-WUS loss cannot be discriminated by the network node from other failures, which may typically result in a retransmission of both LP-WUS, DCI and data, thereby delaying the data transmission to the UE in the case where only a LP-WUS signal was not detected by the UE.

Various techniques or example embodiments are described herein. For example, a low power-wakeup receiver (LP-WUR) of a UE may detect a low power-wakeup signal (LP-WUS) from a network node (e.g., from a gnB). The UE (e.g., the LP-WUR) may enable or activate a main transceiver (e.g., causing the main transceiver of the UE to transition from an off state to an on state) based on the detected LP-WUS. The UE (e.g., the main transceiver) may receive, for example, scheduling information via DCI, and then may transmit wakeup signal feedback to the network node, after being enabled (or turned on). The UE may receive control information or data, and then may transmit HARQ ACK feedback that acknowledges receipt of at least one of downlink control information or data. Or, in the case where the UE receives (e.g., LP-WUR detects) the LP-WUS signal, but the main transceiver of the UE fails to receive data, the wakeup signal feedback may include a wakeup signal acknowledgement (WUS-ACK) to acknowledge receipt of the data, and a HARQ-NACK to indicate that data was not received, where the network node may retransmit the data, but does not need to retransmit the LP-WUS signal, thereby reducing latency of retransmission of the data. Thus, the UE transmission of the WUS-ACK may allow the network node to determine that the LP-WUS was received by the UE, and thus, does not need to be retransmitted. Also, in another example embodiment, the UE may implicitly or indirectly acknowledge receipt of the LP-WUS by transmitting a HARQ-ACK for data that was received by the UE after wakeup/being enabled (thus, this HARQ-ACK for data indirectly also indicating that the UE received the LP-WUS as well).

The wakeup signal feedback, e.g., may include additional information, such as, e.g., at least one of: a power adjustment request to request a power adjustment of the low power-wakeup signal (e.g., to increase or decrease transmit power of the LP-WUS signal, to make it easier for the UE to detect the LP-WUS signal); a time adjustment request to request adjustment of the wakeup signal timeout period between transmission by the network node of the low power-wakeup signal and transmission by the network node of at least one of control information or data to the user device (e.g., to increase the wakeup signal timeout period between transmission of LP-WUS and transmission of data, to provide the UE with more time to enable the main transceiver, or to decrease this wakeup signal timeout period if this period is too long in order to decrease latency for data transmission); or a request to deactivate transmission by the network node of the low power-wakeup signal; or a request to adjust a modulation and coding scheme used by the network node for the transmission of the low power-wakeup signal (e.g., to request for more robust signaling). Thus, one or more of these types of additional information may allow improved performance of the UE, such as decreased latency, increased likelihood of detecting the LP-WUS signal, allowing the UE to request adjustment of the wakeup signal timeout to provide sufficient time for main transceiver wakeup after LP-WUS detection, but not too much time that would introduce unnecessary latency at the UE for data communication to the UE, etc.

From the network node perspective, the network node or gNB may retransmit the low power-wakeup signal, e.g., if the wakeup signal feedback indicates that the user device (UE) has not received the wakeup signal or if no wakeup signal feedback has been received by the network node. Or, otherwise, the network node does not retransmit, (or omits retransmitting) the low power-wakeup signal if the wakeup signal feedback indicates that the user device has received the wakeup signal. As noted, by the network node retransmitting data (if not received by the UE) without retransmitting the LP-WUS (e.g., if the network node received a WUS-ACK from the UE based on the UE receiving the LP-WUS), latency or delay in retransmitting the data to the UE may be reduced, since the network node does not need to retransmit the LP-WUS, and then wait, and then retransmit the data (rather the network node may simply retransmit DCI and then the data, for example).

FIG. 3 is a diagram illustrating operation of a user device (or UE) according to an example embodiment. Operation 310 includes detecting, by a user device, a low power-wakeup signal by a low power-wakeup receiver of the user device received from a network node. Operation 320 includes enabling (e.g., by the low power-wakeup receiver) a main transceiver of the user device based on the detecting the low power-wakeup signal. And, operation 330 includes transmitting, by the main transceiver of the user device to the network node, wakeup signal feedback (e.g., which may be or may include a WUS-ACK) acknowledging the detecting the low power-wakeup signal.

With respect to the method of FIG. 3, the method may further include receiving, by the user device from the network node, downlink control information and data via the main transceiver; and transmitting a Hybrid ARQ (HARQ) Acknowledgement (HARQ ACK) feedback that acknowledges receipt of at least one of the downlink control information or the data, wherein the wakeup signal feedback is implicitly comprised in the HARQ ACK.

With respect to the method of FIG. 3, the method may further include failing to receive data by the main transceiver after being enabled; wherein the wakeup signal feedback includes: the wakeup signal acknowledgement (WUS-ACK) to acknowledge receipt of the low power-wakeup signal; and Hybrid ARQ (HARQ) Negative Acknowledgement (HARQ NACK) feedback that indicates that data was not received by the user device.

With respect to the method of FIG. 3, the method may further include receiving, by the main transceiver of the user device, data that was retransmitted by the network node based on the HARQ NACK feedback, without the user device detecting or receiving another low power-wakeup signal.

With respect to the method of FIG. 3, the wakeup signal feedback further may include additional information associated with the detection of low power-wakeup signals by the user device.

With respect to the method of FIG. 3, the additional information may include at least one of: a request to deactivate transmission by the network node of the low power-wakeup signal; or a request to adjust a modulation and coding scheme used by the network node for the transmission of the low power-wakeup signal.

With respect to the method of FIG. 3, the additional information may include: a power adjustment request to request a power adjustment of the low power-wakeup signal.

With respect to the method of FIG. 3, the additional information may include: a time adjustment request to request adjustment of a time period between transmission by the network node of the low power-wakeup signal and transmission by the network node of at least one of control information and/or data to the user device.

FIG. 4 is a flow chart illustrating operation of a network node according to an example embodiment. Operation 410 includes transmitting, by a network node to a user device, a low power-wakeup signal, to cause a low power-wakeup receiver of the user device to enable a main transceiver of the user device. Operation 420 includes determining, by the network node, whether the network node has received from the user device, wakeup signal feedback indicating whether the user device has received the low power-wakeup signal. Operation 430 includes retransmitting, by the network node, the low power-wakeup signal if the wakeup signal feedback indicates that the user device has not received the wakeup signal or if no wakeup signal feedback has been received by the network node. Operation 440 includes otherwise not retransmitting, or omitting to retransmit, the low power-wakeup signal if the wakeup signal feedback indicates that the user device has received the wakeup signal.

With respect to the method of FIG. 4, the method may further include waiting, by the network node, a wakeup signal timeout period after the transmitting the low power-wakeup signal; and transmit, by the apparatus to the user device, control information and data, after the wakeup signal timeout period.

With respect to the method of FIG. 4, the wakeup signal feedback may be included in a Hybrid ARQ (HARQ) Acknowledgement (HARQ ACK) feedback that acknowledges receipt of the data, and thereby indirectly or implicitly also acknowledges receipt by the user device of the low power-wakeup signal.

With respect to the method of FIG. 4, the wakeup signal feedback may include: a wakeup signal acknowledgement (WUS-ACK) to acknowledge receipt of the low power-wakeup signal; and a Hybrid ARQ (HARQ) Negative Acknowledgement (HARQ NACK) feedback that indicates that data was not received by the user device.

With respect to the method of FIG. 4, the method may further include: omitting to retransmit, or not retransmitting, to the user device, the low power-wakeup signal based on receiving the wakeup signal acknowledgement; and retransmit, to the user device, the data, based on receiving the HARQ NACK for the data.

With respect to the method of FIG. 4, the wakeup signal feedback may further include additional information associated with the detection of low power-wakeup signals by the user device.

With respect to the method of FIG. 4, the additional information may include at least one of: a power adjustment request to request a power adjustment of the low power-wakeup signal; a time adjustment request to request adjustment of the wakeup signal timeout period between transmission by the network node of the low power-wakeup signal and transmission by the network node of at least one of control information or data to the user device; or a request to deactivate transmission by the network node of the low power-wakeup signal; or a request to adjust a modulation and coding scheme used by the network node for the transmission of the low power-wakeup signal.

With respect to the method of FIG. 4, the method may further include receiving, by the network node from the user device, a wakeup signal negative acknowledgement (WUS-NACK) that indicates that the user device did not receive the low power-wakeup signal, e.g., the user device (UE) may have been enabled (or caused to transition to on state) based on DRX or other technique (e.g., not LP-WUS), and then determined that it (the UE) never received the LP-WUS signal. For example, the network node may then perform an adjustment for transmission of LP-WUS signals, such as increasing transmission power of the LP-WUS signal, so that the LP-WUR is more likely to receive or detect such LP-WUS in the future. In yet another example, the network node may indicate to the UE to disable the LP-WUS mechanism and adjust the configuration of DRX and other power saving techniques.

Various techniques or embodiments herein describe an error control mechanism (based for example on Automatic Repeat Request, ARQ) to protect against detection loss of the LP-WUS signal, for example. The proposed error control mechanism is based on, for example: (a) an acknowledgement signal (WUS-ACK) transmitted by the UE upon reception of the LP-WUS signal and (b) at least a timeout (WUS-TIMEOUT) used by the network node (or network) to retransmit the LP-WUS signal if the acknowledgement (WUS-ACK) has not been received within the time defined by the timeout (WUS-TIMEOUT). The WUS-ACK feedback can be transmitted by the UE using e.g., the PUCCH or PUSCH channel. WUS-ACK can also be multiplexed with the classical HARQ feedback in case the DATA transmission has been scheduled in earlier slots.

For example, the network node may configure the (time) resources for the UE to transmit the WUS-ACK (WUS acknowledgement, which acknowledges receipt by UE or LP-WUR (of UE) of the LP-WUS). In one example, the WUS-ACK can be configured to be transmitted by UE after a fixed offset from a LP-WUS reception, e.g., immediately after the main radio (MR) (or main transceiver) activation. This option can be used when the WUS detection loss likelihood is not sufficiently low so to trigger the LP-WUS retransmission as soon as possible. In another example, the WUS-ACK can be configured to be multiplexed with the HARQ feedback in case the data transmission has been scheduled in earlier slots prior to the reception of WUS-ACK. In one example, the HARQ feedback can be extended to include information about the WUS-ACK. In another example, a new feedback can be introduced to include information about both the HARQ feedback and WUS-ACK. In yet another example, the WUS-ACK can be configured to be transmitted after a longer time-offset from the LP-WUS reception, but the WUS-ACK transmission can be dropped if meanwhile data was received. In this case, only the legacy HARQ feedback is sent by the UE as it implicitly (or indirectly) indicates the reception of the LP-WUS.

An example of a proposed WUS-ARQ scheme may work as follows:

UE: Upon successful decoding/detection of WUS signal, the UE activates its main transceiver/main radio (MR). After the main transceiver (or main radio) is active or on (enabled), the UE sends an acknowledgement (WUS-ACK) in the dedicated resources (either physical uplink control channel/PUCCH or physical uplink shared channel/PUSCH).

Network Node: On the transmission of the LP-WUS signal, the network starts a timer set as WUS-TIMEOUT. If WUS-ACK has not been received in the "U" (uplink) slot of the TDD (time division duplex) radio frame after the timer has expired, the network retransmits the WUS signal, resets the timer and starts it again. U refers to uplink slot, and D refers to downlink slot of TDD radio frame. If WUS-ACK has been received by network node, before the timer (initially set to WUS-TIMEOUT value) has expired, the timer is stopped.

In an additional embodiment the WUS-ACK transmission is conditioned on the need/option to transmit the HARQ feedback for PDSCH. If UE (due to detecting valid scheduling PDCCH), needs to transmit HARQ feedback (for data) in the next valid UL resource after LP-WUS detection, UE omits the transmission of WUS-ACK (and transmit only 'normal' HARQ feedback).

In an additional embodiment, the WUS-ACK signal is used to dynamically control the transmission power of LP-WUS and the deactivation of LP-WUS mechanism in case of errors. If too many errors are identified, the network node decides to increase the transmission power or deactivate the LP-WUS mechanism. More complex WUS ARQ feedback enables the UE to suggest the increase or decrease of the transmission power of LP-WUS. This may be performed, e.g., by transmitting additional information to the network along with the WUS-ACK.

Some example advantage of the various embodiments or techniques described herein may include, for example: The loss of the WUS signal can be detected earlier than waiting for the classical HARQ feedback. The network node (network) can distinguish between WUS and DCI/data loss. LP-WUS retransmission can be triggered earlier, thus increasing the number of available opportunities for LP-WUS and data retransmission. These example advantages may improve reliability and/or the latency for communications, such as for delay-critical services like XR applications, and/or other applications or services.

Figure 5:
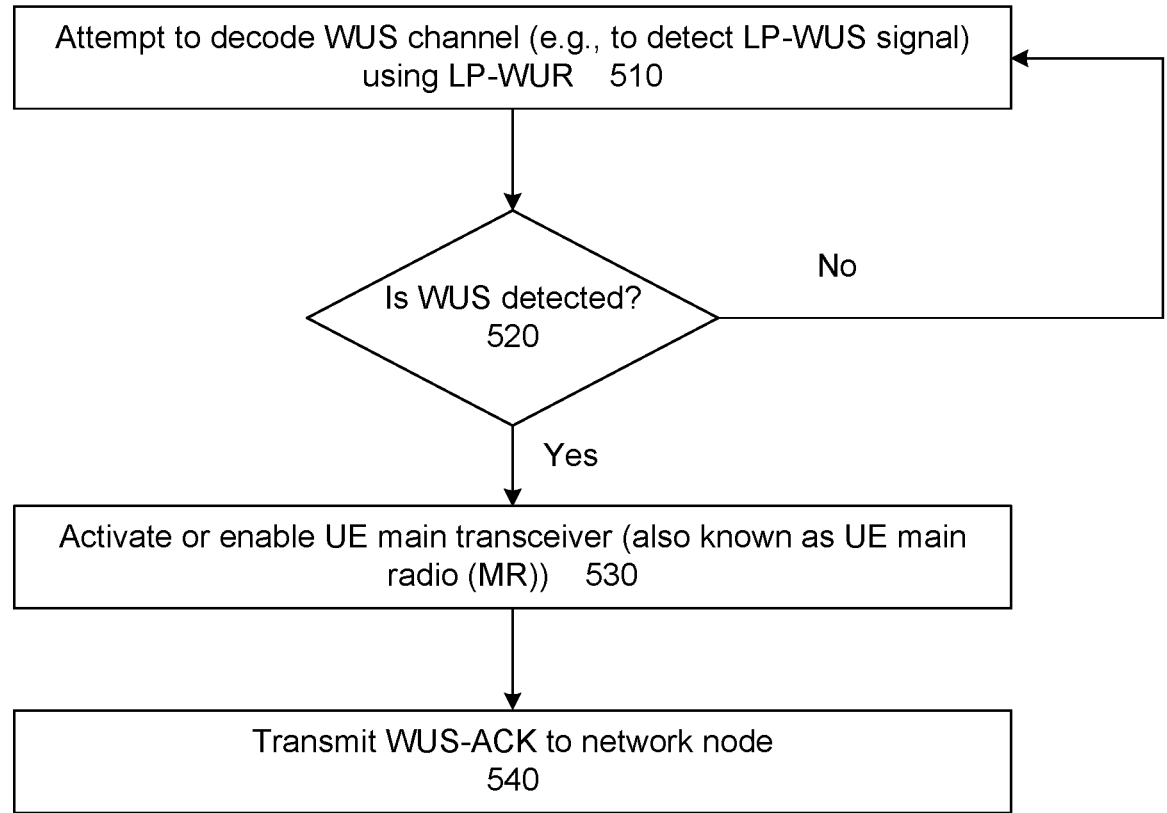
FIG. 5 is a diagram illustrating operation of a LP-WUS-ARQ mechanism as performed by a user device or UE according to an example embodiment.
Figure 6:
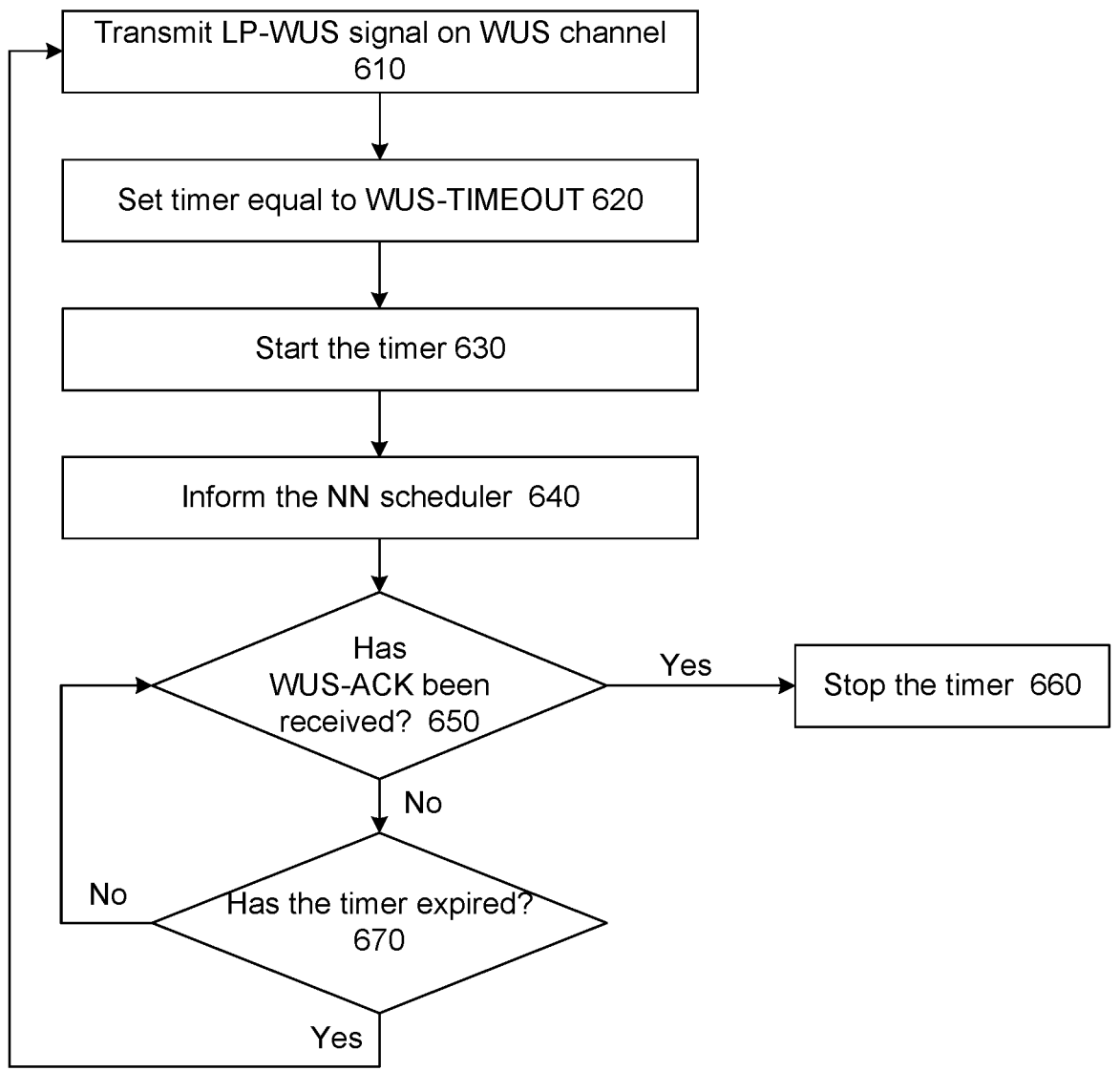
FIG. 6 is a diagram illustrating operation of a LP-WUS-ARQ mechanism as performed by a network node (e.g., gNB) according to an example embodiment.

FIG. 5 is a diagram illustrating operation of a LP-WUS-ARQ mechanism as performed by a user device or UE according to an example embodiment. FIG. 6 is a diagram illustrating operation of a LP-WUS-ARQ mechanism as performed by a network node (e.g., gNB) according to an example embodiment. The UE keeps decoding the channel dedicated to LP-WUS transmission using the low power-wakeup receiver (LP-WUR, or simply referred to herein as WUR). If LP-WUS signal is detected by LP-WUR, the UE activates the main transceiver (main radio/MR) and the main transceiver of the UE transmits the WUS-ACK in the resources dedicated by the network for this objective (e.g., resources obtained by UE via DCI after main transceiver of UE is enabled after UE detects LP-WUS). Resources for the WUS-ACK signal can be dedicated in PUCCH or PUSCH. The transmission of the WUS-ACK can be executed only when the main transceiver (or main radio/MR) of UE is fully active and the dedicated resources becomes available. At 510, the low power-wakeup receiver (LP-WUR) of the UE decodes/attempts to decode the low power-wakeup signal (LP-WUS) channel to detect a LP-WUS. At 520, if not LP-WUS was detected, the process returns to operation 510. At 530, if a LP-WUS was detected, at 530, the UE or LP-WUR enables or activates the UE main transceiver (main Tx/Rx), also referred to as main radio (MR) of UE (e.g., LP-WUR turns on main transceiver or causes the main transceiver to turn on or transition from off or sleep state to an on state). At 540, after the UE main transceiver has been enabled, the UE (via the main transceiver) may receive downlink control information (DCI) from network node via PDCCH that includes scheduling information or uplink resources for the UE. The UE (via the main transceiver) transmits via these uplink resources the wakeup signal acknowledgement (WUS-ACK) that acknowledges receipt by UE of the LP-WUS.

FIG. 6 is a diagram illustrating operation of a LP-WUS-ARQ mechanism as performed by a network node (e.g., gNB) according to an example embodiment. At 610, when the network node needs to wake up the UE (e.g., when data is ready for transmission to UE), the network node may transmit the LP-WUS signal at 610, and at 620 the network node sets a timer equal to WUS-TIMEOUT. WUS-TIMEOUT should be long enough to account for the time required by the UE to fully enable its main transceiver (main radio) and additional delays (e.g., the time when the first U slot to become available after WUS has been decoded by the UE and its main transceiver is fully enabled). After the timer is triggered at 630, the scheduler of network node is informed at 640 about the transmission of the LP-WUS signal. This indication is used by the scheduler to wait until the UE main transceiver is fully active/on before sending the scheduling DCI and scheduling the data transmission. At 650, if the WUS-ACK is received before the timer has expired, then the network stops the timer at 660. In contrast, if the WUS-ACK has not been received before the timer has expired (670), the network node may re-executes the entire procedure from the beginning, returning to operation 610.

In another embodiment, WUS-ACK transmission can be omitted if the UE is able to decode the PDCCH and PDSCH before sending the UCI (uplink control information, transmitted within PDCCH, along with DCI) in the next U slot. This happens for example when D slots for PDCCH and PDSCH are available after the main transceiver (or main radio/MR) ramp-up time has expired. In this case, UE shall execute the following procedure: UE detects LP-WUS (with WUR) and activates the main transceiver; UE monitors for PDCCH with main transceiver; and, if UE does not detect PDCCH with the UE main transceiver (main radio) to prior the next UL slot/resource to transmit UCI, UE will provide WUS-ACK for the detection of the LP-WUS (in PUCCH). If UE detects PDCCH and the corresponding PDSCH (scheduled by the PDCCH) can be received by UE before the next UCI, UE provides only HARQ feedback (e.g., HARQ data feedback, for data) based on the PDSCH decoding and omits any WUS-ACK. If UE detects PDCCH but the corresponding PDSCH (scheduled by the PDCCH) cannot be received before the next UCI (e.g., is cross-slot scheduled to DL slot after the next UL slots), UE will provide WUS-ACK for the detection of the LP-WUS (in PUCCH).

When UE can omit the WUS-ACK, the network may also use a modified procedure than the one illustrated in FIG. 6. In particular, the network node may execute the following procedure: At step 1, network node transmits the LP-WUS signal; Network node sets a timer equal to WUS-TIMEOUT, starts the timer and informs the scheduler. If PDCCH and the corresponding PDSCH (scheduled by the PDCCH) can be received by the UE before the next UCI: Network node transmits scheduling DCI to UE and schedules the transmission in PDSCH according to DCI. Network node waits for only for the HARQ feedback. If HARQ feedback is not received, Network node repeats from step 1 and perform a second transmission attempt. Otherwise (HARQ data feedback received), the network (or network node) may, for example, proceed according to HARQ feedback and current specifications, for example. Otherwise (PDCCH and the corresponding PDSCH (scheduled by the PDCCH) can be received by the UE before the next UCI): Network checks if WUS-ACK has been received in next UCI. If WUS-ACK has not been received, Network detects WUS loss and performs a second transmission attempt repeating from step 1. Otherwise (WUS-ACK has been received), Network transmits scheduling DCI and schedules the transmission in PDSCH according to DCI.

Signaling scheme for WUS-ARQ mechanism:

According to an example embodiment, the WUS-ARQ feedback scheme used to communicate the correct reception of LP-WUS signal can be implemented using a dedicated message, which is called WUS-ACK. WUS-ACK can be implemented, for example, as a single bit transmitted in the PUCCH or PUSCH, with the bit having the following meaning (as an illustrative example): 1: WUS has be correctly decoded/detected; 0: WUS has not been decoded/detected and UE main transceiver (UE main radio) is active. WUS-ACK equal to '0' indicates that UE main transceiver has been activated by some other scheme than LP-WUS. The absence of WUS-ACK indicates that the UE's main transceiver or main radio is still inactive and WUS signal must be retransmitted.

More complex feedback information can be provided for the WUS-ACK. For example, an additional bit (as additional information) can be used for time adjustment, e.g., to indicate if the delay between the WUS and DCI was too short and ask the network to increase the time lasting between the transmission of the WUS signal and the transmission of the DCI. For example, this may be used to increase or decrease the WUS timeout period. A possible embodiment for the second bit of WUS-ACK can be: 1: increase time between WUS and DCI; 0: decrease time between WUS and DCI. This can be particularly useful when the network does not know the exact ramp-up time.

Similarly, an additional bit(s), as the additional information in the WUS-ACK, may be used to indicate to make the WUS transmission more robust (e.g., to request and obtain a lower modulation and coding scheme (MCS) for the LP-WUS transmission) or less robust (e.g., request a higher MCS for LP-WUS transmission), to increase or decrease the LP-WUS transmission power, or to deactivate the LP-WUS transmission, for example.

Figure 7:
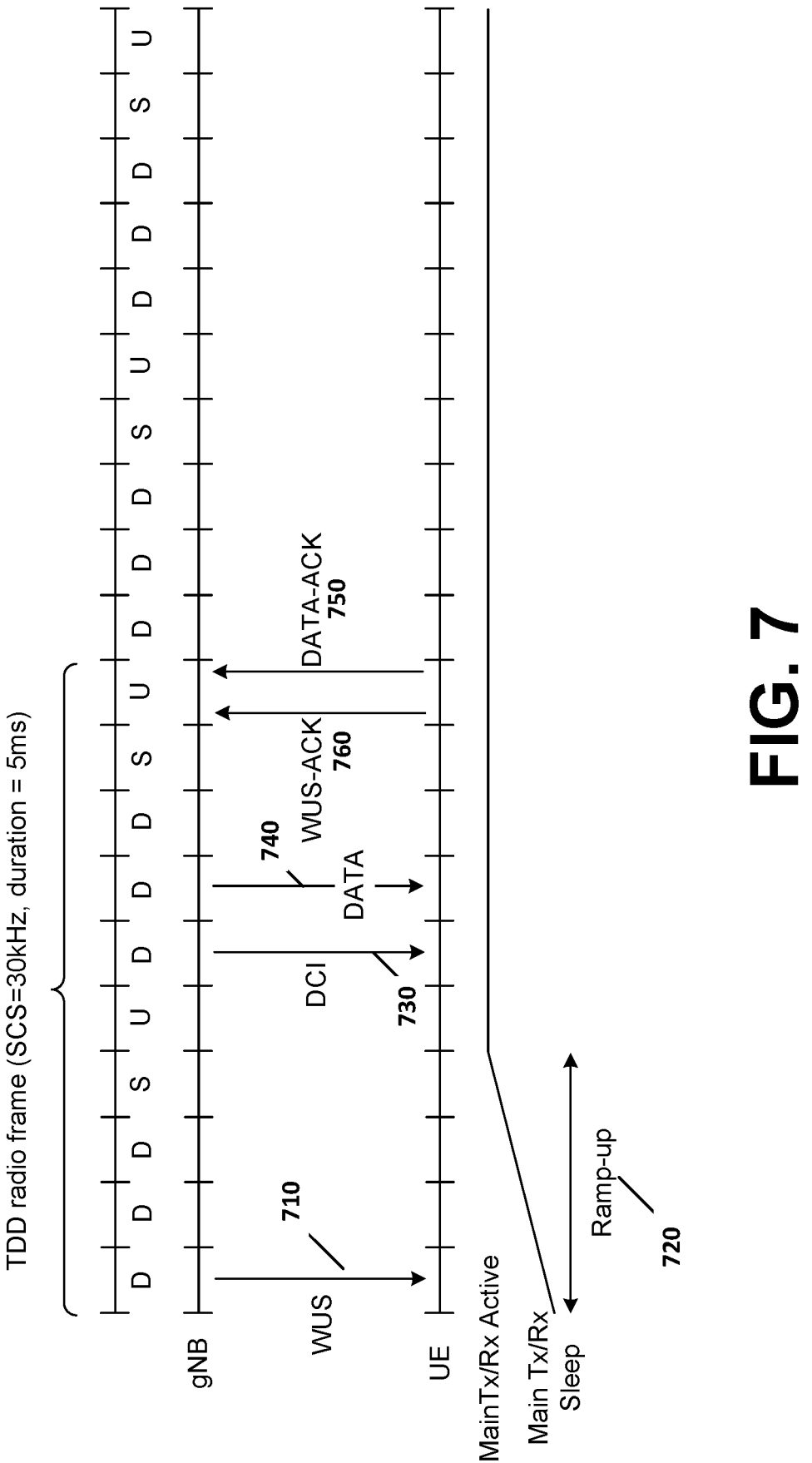
FIG. 7 is a diagram illustrating an example message exchange between a UE and the network node when there is no packet loss according to an example embodiment.

FIG. 7 is a diagram illustrating an example message exchange between a UE and the network node considering numerology 1 (30 kHz for subcarrier spacing/SCS) and "DDDSUDDDSU" as radio frame when there is no packet loss according to an example embodiment. Thus, in FIG. 7, there is no data loss or LP-WUS loss (both are received and acknowledged by the UE). The LP-WUS (or simply WUS) is received by the UE, and the UE acknowledged receipt of WUS with a WUS-ACK. UE also received the data and replies with a data ACK (e.g., HARQ ACK). Thus, as shown in FIG. 7, when the data become available at the network node or gNB for transmission to the UE, at 710, the network node transmits LP-WUS (e.g., shown in the figures as WUS) to the UE in order to wake up the UE's main transceiver (main radio/MR). Before scheduling data transmission to UE (and thus, before the network node transmits DCI or data to the UE), the network node should wait for the full activation of the UE main transceiver (e.g., corresponding to WUS timeout period). This phase is called ramp-up (720, in FIG. 7) and takes a certain amount of time, which depends on the UE main transceiver sleep state. For example, the ramp-up may be (or may include) the period of time for UE main transceiver to be activated/triggered by LP-WUR of UE and turn on after LP-WUR receives LP-WUS from the network node. DCI (e.g., downlink control information that may include UL and/or DL scheduling information for the UE) and data that are transmitted by the network node and arrive at UE before the UE main transceiver is on will not be detected or decoded by UE, and thus will be lost. However, as noted, the data and LP-WUS are successfully received by the UE in the example of FIG. 7. In FIG. 7, it may be assumed the ramp-up time is equal to 2 ms, for example.

After the ramp-up time is over, the network node can schedule the data transmission by transmitting the scheduling DCI command and data over the PUSCH (physical uplink shared channel) and PDSCH (physical downlink shared channel), respectively. Thus, for example, after waiting the WUS timeout period (e.g., which may correspond to ramp-up period 720) after transmitting WUS, the network node may transmit DCI (at 730) and data (at 740). Finally, in the second "U" slot (last slot of the radio frame), both the HARQ feedback (i.e., DATA-ACK 750 in FIG. 7) and WUS feedback (WUS-ACK 760) are signaled back by the UE to the network node or gNB. Note that depending on the ramp-up time, WUS-ACK (the acknowledgement that acknowledges receipt by UE of the LP-WUS) can be transmitted earlier than the HARQ/data feedback (DATA-ACK) or even the DCI command. Thus, FIG. 7 shows an example use of WUS-ACK feedback without any loss. Transmission of DCI (PDCCH) and data (PDSCH) may be executed without waiting for the reception of the WUS-ACK feedback. WUS-ACK can be multiplexed with the classical HARQ ACK feedback (DATA-ACK).

Figure 8:
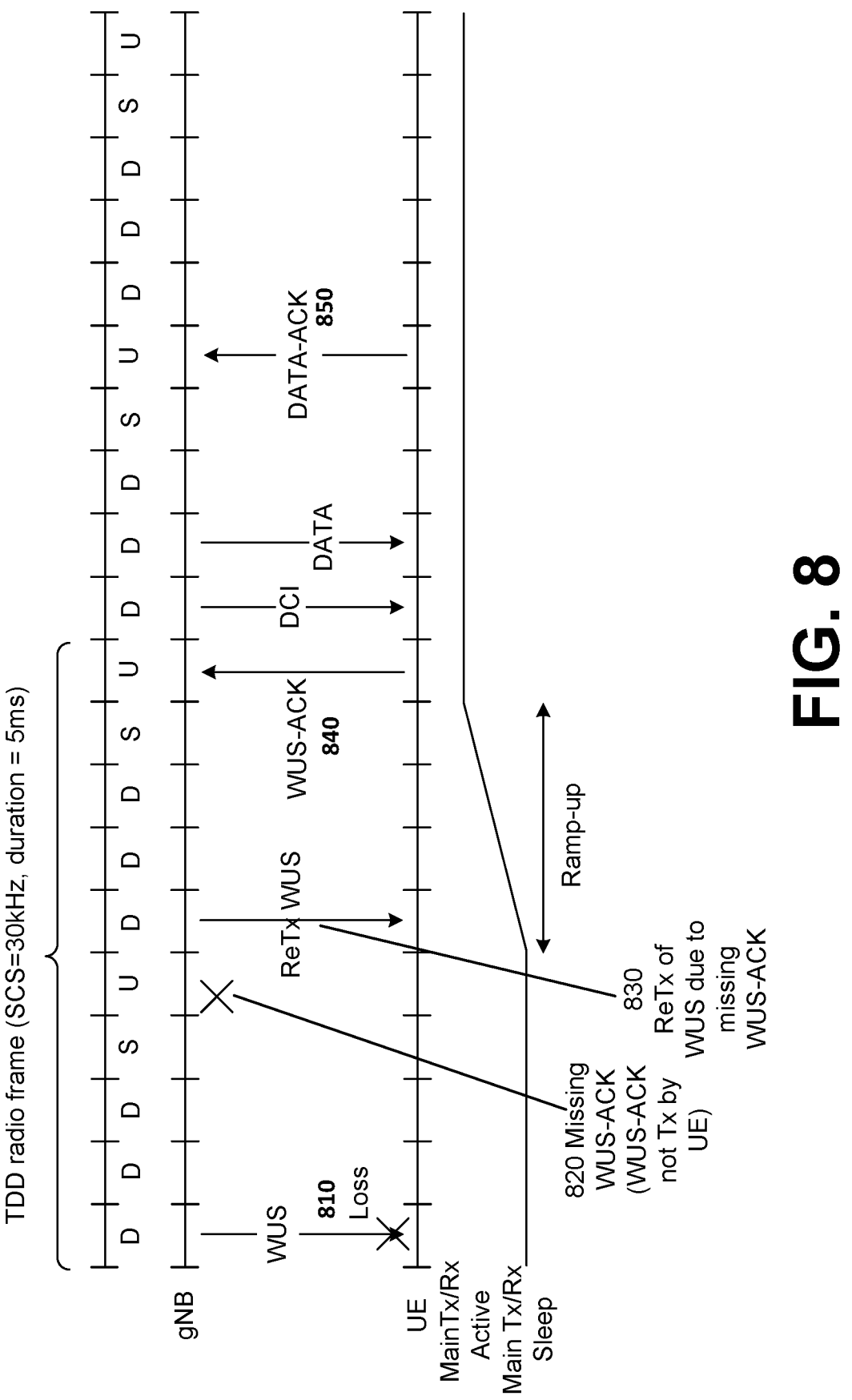
FIG. 8 is a diagram illustrating an example message exchange between a UE and the network node when a loss occurs during the transmission of the LP-WUS signal.

FIG. 8 is a diagram illustrating an example message exchange between a UE and the network node when a loss occurs during the transmission of the LP-WUS signal. The absence of WUS-ACK helps the network node to determine or detect early the LP-WUS loss and repeats its transmission (retransmit the LP-WUS). This in turns help to wake up the UE (wake up or enable the main transceiver of the UE) earlier and complete the data transmission by the third "U" slot, which is used for the transmission of the HARQ feedback. Compared to a legacy procedure, the network can complete the transmission less time, e.g., network node may be able to complete the transmission in 7 ms instead of 10 ms, for example. This may allow an opportunity to accommodate an additional data retransmission in case of transmission error on the PDCCH or PDSCH. Thus, FIG. 8 is a diagram illustrating an example of use of WUS-ACK feedback with loss of LP-WUS signal. Thus, in the example of FIG. 8, at 810, the LP-WUS is not received or detected by the UE (Loss, shown by X). Because the LP-WUR of the UE does not detect the LP-WUS at 810, the UE main transceiver is not enabled or turned on, and as a result, at 820, the UE does not transmit a WUS-ACK to the network node (resulting in a missing WUS-ACK, at 820).

At 820 of FIG. 8, the missing WUS-ACK (or failure to receive WUS-ACK at network node) notifies the network node that the UE did not receive the LP-WUS that was transmitted at 810. Because the network node (or gNB) does not receive the WUS-ACK (missing WUS-ACK at 820), the network node (gNB) retransmits the LP-WUS at 830. The missing WUS-ACK (e.g., at 820) helps the network node to detect the WUS loss (e.g., at 820) and the network node then retransmits WUS (e.g., at 830 in this example) in the next available slot (after WUS timeout period). UE LP-WUR (wakeup receiver) may detect this second WUS transmission (at 830), enable (or turn on) the UE main transceiver, and then UE main transceiver may transmit a WUS-ACK to network node at 840, for example. This WUS-ACK at 840 notifies the network node that the LP-WUS transmitted at 830 was received by the UE. UE may acknowledge receipt of data by transmitting DATA-ACK at 850.

At least in some cases, depending on the TDD radio frame configuration, LP-WUS transmission time and time to enable the UE main transceiver (radio ramp-up time), transmission of DCI (PDCCH) and data (PDSCH) may be executed without waiting for the reception of the WUS-ACK feedback. Also, for example, the example of the LP-WUS feedback (i.e., the message WUS-ACK) improves detection of WUS loss even when the UE main transceiver is switched from micro sleep to active mode. The switch from micro sleep to active mode is practically instantaneous (e.g., there may be very little or no ramp-up time), but the detection of the LP-WUS loss cannot be performed until the next UL slot.

Figure 9:
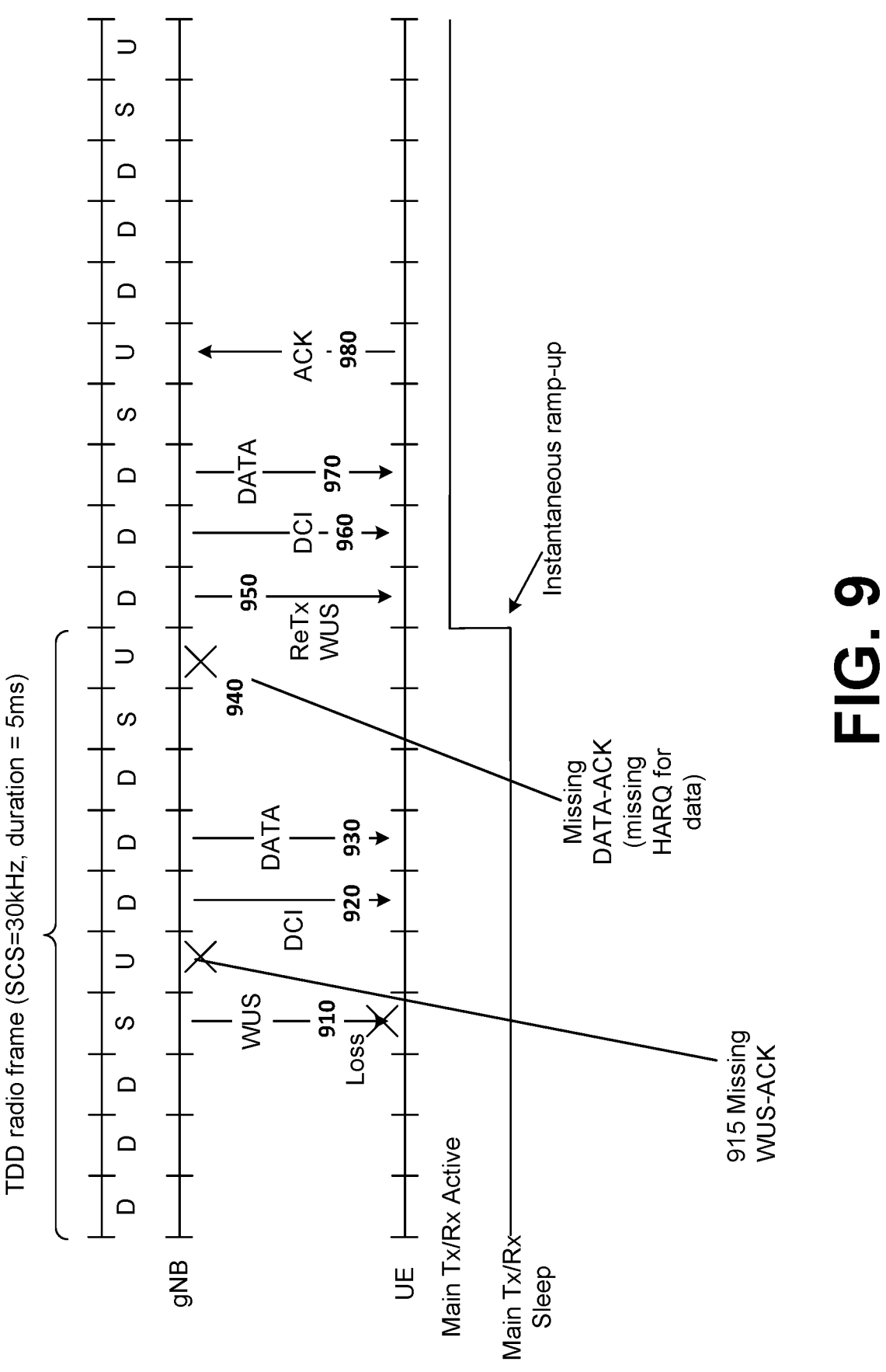
FIG. 9 is a diagram illustrating, for example, a LP-WUS-based wakeup and scheduling of quasi-periodic packet arrivals with WUS loss and instantaneous ramp-up of UE main transceiver (e.g., with switch from micro sleep to active mode) according to an example embodiment.

Let us consider the example of FIG. 9, which has the same radio frame as in the example above, namely DDD-SUDDDSU. FIG. 9 is a diagram illustrating, for example, a LP-WUS-based wakeup and scheduling of quasi-periodic packet arrivals with WUS loss and instantaneous ramp-up of UE main transceiver (e.g., with switch from micro sleep to active mode) according to an example embodiment. Let us assume data for the UE arrives at the network node for transmission to the UE during or may be before the first slot S, and then network node transmits LP-WUS soon during slot S in order to wake up the UE main transceiver. However, at 910, the LP-WUS is not detected by UE, but is lost. In this illustrative example, the network node scheduler may need to wait at least 2 slots before scheduling data (in fourth D slot) and the HARQ (DATA-ACK) feedback will not be received until the second U slot (see 940, missing DATA-ACK). Only at that time the network node will know whether the UE was awake (e.g., whether UE main transceiver was on or enabled) and was able to receive the data correctly. Also, in this example, as shown in FIG. 9, the UE never received LP-WUS at 910, and thus UE main transceiver was not enabled, and thus, UE did not receive DCI or data at 920, 930, respectively. As a result, the UE does not transmit HARQ ACK or DATA-ACK, resulting in a missing DATA-ACK at 940. This may cause the network node to retransmit LP-WUS at 950, and retransmit DCI and data at 960, 970, respectively. In this illustrative example, UE receives data at 970, and transmits a DATA-ACK to network node at 980 (e.g., which may acknowledge receipt of LP-WUS, DCI and data).

Another illustrative example embodiment will now be briefly described with respect to FIG. 9 (although not all messages or errors for this embodiment are shown in FIG. 9 for this example embodiment). Packets must typically be delivered to the UE within a packet delay budget (PDB), where the PDB may be 10 ms or 15 ms, for example, depending on the type of application. If the UE sends a WUS-ACK in the first U slot, then the network node can react more quickly in case of LP-WUS loss. For example, the probability of such an event may be, e.g., 20% (1 out of 5 slots) and in case of LP-WUS error the delay of the packet transmission risks increasing by 2.5 ms (as an illustrative example) with the eventual loss of a HARQ retransmission attempt when PDB=10 ms. This additional delay and loss of an HARQ retransmission attempt is not negligible for delay-critical services, like XR applications as illustrated in Table 1. Table 1 compares the legacy and proposed WUS ARQ feedback scheme considering SCS equal to 30 kHz, slot duration of 0.5 ms, and radio frame duration of 5 ms). Specifically, the packet enters or arrives at the buffer of the network node just before slot #3 and it is ready to be scheduled in slot #3. The LP-WUS signal is sent in slot #3 by the network to wake-up the UE. The PDB is 10 ms, for example, and each slot has a duration of 0.5 ms (30 kHz of SCS). The LP-WUS signal is lost in the first transmission attempt (910), but it is correctly detected by the UE at the second attempt (950). In this example, the packet needs multiple, e.g., three, transmission attempts to be correctly received by the UE. Under these assumptions, we can observe that the legacy scheme does not meet the PDB since the HARQ feedback of the third retransmission is received beyond the PDB (the PDB expires at the end of slot 22). In contrast, the network node can detect earlier the WUS loss using the proposed WUS-ARQ feedback (WUS feedback) scheme (in slot 4, at 915, the WUS-ACK is missing, meaning the UE did not wake up the UE main transceiver) and retransmit it soon in slot 5 (not shown in FIG. 9). In slot 9, the network node may receive the WUS-ACK and a DATA-NACK (e.g., HARQ NACK) (not shown in FIG. 5) indicating that the UE's main transceiver (or main radio) is active (on) but the UE was not able to correctly receive the data. The second and third attempts of data transmission, for example, are executed in slots 11 and 16, respectively (not shown in FIG. 9). The third attempt of data transmission may be acknowledged by the UE in slot 19, before the PDB expires (also not shown in FIG. 9).

TABLE 1

| Slot No. | Slot | Legacy | WUS ARQ Feedback |
|---|---|---|---|
| 0 | D | | |
| 1 | D | | |
| 2 | D | | |
| 3 | S | LP-WUS | WUS |
| 4 | U | | Missing WUS-ACK |
| 5 | D | DCI | WUS |
| 6 | D | DATA | DCI |
| 7 | D | | DATA |
| 8 | S | | |
| 9 | U | Missing DATA-ACK | WUS-ACK, DATA-NACK |
| 10 | D | WUS | DCI |
| 11 | D | DCI | DATA |
| 12 | D | DATA | |
| 13 | S | | |
| 14 | U | DATA-NACK | DATA-NACK |
| 15 | D | DCI | DCI |
| 16 | D | DATA | DATA |
| 17 | D | | |
| 18 | S | | |
| 19 | U | DATA-NACK | DATA-ACK (PDB fulfilled) |
| 20 | D | DCI | |
| 21 | D | DATA | |
| 22 | D | | |
| 23 | S | | |
| 24 | U | DATA-ACK (PDB exceeded) | |
| 25 | D | | |
| 26 | D | | |
| 27 | D | | |
| 28 | S | | |
| 29 | U | | |

Table 1 illustrates Legacy versus LP-WUS ARQ feedback. We assume the packet arrives in slot #3, when the first LP-WUS is sent. SCS (subcarrier spacing)=30 kHhz (i.e., slot duration is 0.5 ms) and PDB=10 ms (i.e., 20 slots). The packet needs three transmission attempts to be received correctly in this example. LP-WUS is lost only at the first attempt.

LP-WUS loss detection and handling:

The LP-WUS ARQ feedback techniques described herein may enable the network node (gNB) to distinguish errors and handle them differently. Specifically, the network node can decide whether LP-WUS needs to be retransmitted before executing another attempt of DCI and data transmission. In an additional embodiment, LP-WUS ARQ feedback (WUS-ACK) can also be used to execute other actions like the deactivation of LP-WUS and the increase of the transmission power for retransmission attempts of LP-WUS after a LP-WUS loss has been detected.

When the network node detects the loss of the LP-WUS due to the absence of the WUS-ACK in the UCI, the network node may increase the transmission power before reattempting the transmission of LP-WUS. The power boost step (i.e., the increase of the transmission power) may be performed before the step "Transmit of WUS Signal on WUS Channel" illustrated in FIG. 6. The increase of the power can be performed incrementally at each further retransmission attempt until the maximum transmission power is reached. Transmission power can also be decreased incrementally after a certain number N>0 of LP-WUS signals are received correctly by the UE (i.e., if a certain number N of consecutive WUS-ACK are received correctly by the network). Furthermore, after a certain number M>0 of WUS losses, LP-WUS mechanism is deactivated by the network. The deactivation can be communicated to the UE when it autonomously wakes up, for example during the On-Duration of the DRX cycle. The reactivation shall be requested by the UE via dedicated RRC messages and procedure.

The increase and decrease steps and the increase and decrease operations for the dynamic control of the transmission power of LP-WUS can differ. A possible implementation consists in increasing the power by a multiplicative factor and decreasing the power by an additive (and negative) factor. This corresponds to implementing a Multiplicative Increase Additive Decrease (MIAD) strategy. The multiplicative and additive factors can be communicated to the UE using a dedicated RRC IE.

Figure 10:
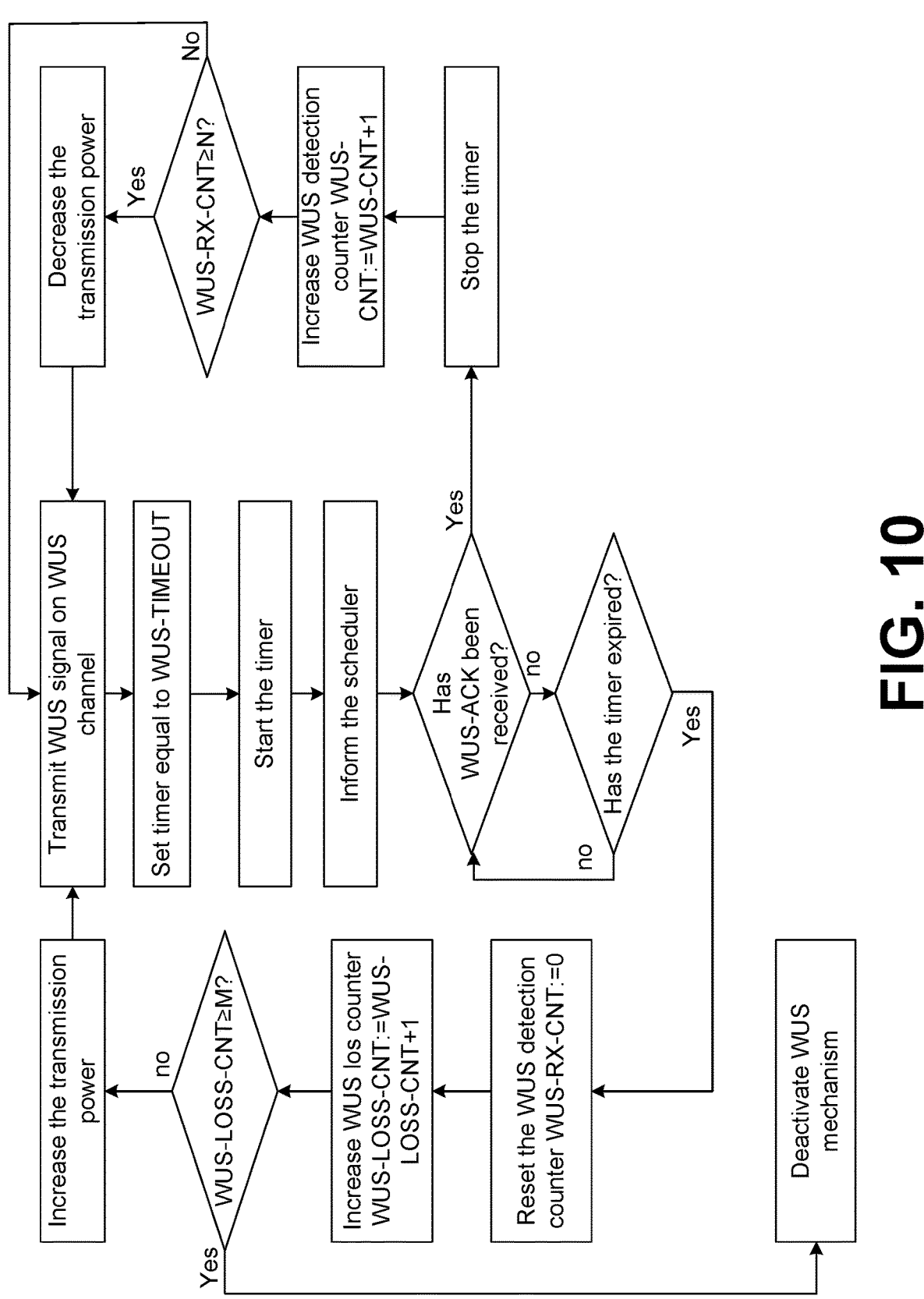
FIG. 10 is a diagram illustrating operation of a dynamic control of the transmission power and deactivation of LP-WUS by a network node according to an example embodiment.

FIG. 10 is a diagram illustrating operation of a dynamic control of the transmission power and deactivation of LP-WUS by a network node according to an example embodiment. Multiplicative Increase Additive Decrease (MIAD) strategy may be implemented in the two steps "Increase the transmission power" and "Decrease the transmission power". More complex procedures for the dynamic control of the transmission power of LP-WUS include the definition of more complex WUS ARQ feedback to let the UE indicating the amount of power increase/decrease that the network node shall execute. For example, two additional bits in the WUS ARQ feedback sent by the UE may enable the encoding of the following indications: 11: increase the power; 10: decrease the power; 00: maintain the current power.

Example 1. A method comprising: detecting, by a user device, a low power-wakeup signal by a low power-wakeup receiver of the user device received from a network node; enabling a main transceiver of the user device based on the detecting the low power-wakeup signal; and transmitting, by the main transceiver of the user device to the network node, wakeup signal feedback acknowledging the detecting the low power-wakeup signal.

Example 2. The method of Example 1, further comprising: receiving, by the user device from the network node, downlink control information and data via the main transceiver; and transmitting a Hybrid ARQ (HARQ) Acknowledgement (HARQ ACK) feedback that acknowledges receipt of at least one of the downlink control information or the data, wherein the wakeup signal feedback is implicitly comprised in the HARQ ACK.

Example 3. The method of any of Examples 1-2, further comprising: failing to receive data by the main transceiver after being enabled; wherein the wakeup signal feedback comprises: the wakeup signal acknowledgement (WUS-ACK) to acknowledge receipt of the low power-wakeup signal; and Hybrid ARQ (HARQ) Negative Acknowledgement (HARQ NACK) feedback that indicates that data was not received by the user device.

Example 4. The method of Example 3, further comprising: receiving, by the main transceiver of the user device, data that was retransmitted by the network node based on the HARQ NACK feedback, without the user device detecting or receiving another low power-wakeup signal.

Example 5. The method of any of Examples 1-4, wherein the wakeup signal feedback further comprises additional information associated with the detection of low power-wakeup signals by the user device.

Example 6. The method of Example 5, wherein the additional information comprises at least one of: a request to deactivate transmission by the network node of the low power-wakeup signal; or a request to adjust a modulation and coding scheme used by the network node for the transmission of the low power-wakeup signal.

Example 7. The method of Example 5, wherein the additional information comprises: a power adjustment request to request a power adjustment of the low power-wakeup signal.

Example 8. The method of Example 5, wherein the additional information comprises: a time adjustment request to request adjustment of a time period between transmission by the network node of the low power-wakeup signal and transmission by the network node of at least one of control information and/or data to the user device.

Example 9. An apparatus comprising means for performing the method of any of Examples 1-8.

Example 10. An apparatus, comprising: a low power-wakeup receiver; a main transceiver; at least one processor; and at least one memory storing instructions that, when executed by the at least one processor, cause the apparatus at least to: detect, by the low power-wakeup receiver, a low power-wakeup signal received from a network node; enable, by the low power-wakeup receiver, the main transceiver based on the detecting the low power-wakeup signal; and transmit, by the main transceiver to the network node, wakeup signal feedback acknowledging the detecting the low power-wakeup signal.

Example 11. The apparatus of Example 10, wherein the apparatus is further caused to: receive, from the network node, downlink control information and data via the main transceiver; and, transmit, via the main receiver, a Hybrid ARQ (HARQ) Acknowledgement (HARQ ACK) feedback that acknowledges receipt of at least one of the downlink control information or the data, wherein the wakeup signal feedback is implicitly comprised in the HARQ ACK.

Example 12. The apparatus of any of Examples 10-11, wherein the apparatus is further caused to: fail to receive data by the main transceiver after being enabled; wherein the wakeup signal feedback comprises: the wakeup signal acknowledgement (WUS-ACK) to acknowledge receipt of the low power-wakeup signal; and Hybrid ARQ (HARQ) Negative Acknowledgement (HARQ NACK) feedback that indicates that data was not received by the apparatus.

Example 13. The apparatus of Example 12, wherein the apparatus is further caused to: receive, by the main transceiver, data that was retransmitted by the network node based on the HARQ NACK feedback, without the apparatus detecting or receiving another low power-wakeup signal.

Example 14. The apparatus of any of Examples 10-13, wherein the wakeup signal feedback further comprises additional information associated with the detection of low power-wakeup signals by apparatus.

Example 15. The apparatus of Example 14, wherein the additional information comprises at least one of: a request to deactivate transmission by the network node of the low power-wakeup signal; or a request to adjust a modulation and coding scheme used by the network node for the transmission of the low power-wakeup signal.

Example 16. The apparatus of Example 14, wherein the additional information comprises: a power adjustment request to request a power adjustment of the low power-wakeup signal.

Example 17. The apparatus of Example 14, wherein the additional information comprises: a time adjustment request to request adjustment of a time period between transmission by the network node of the low power-wakeup signal and transmission by the network node of at least one of control information or data to the apparatus.

Example 18. An apparatus, comprising: at least one processor; and at least one memory storing instructions that, when executed by the at least one processor, cause the apparatus at least to: transmit, by the apparatus to a user device, a low power-wakeup signal, to cause a low power-wakeup receiver of the user device to enable a main transceiver of the user device; determine whether the apparatus has received from the user device wakeup signal feedback indicating whether the user device has received the low power-wakeup signal; and retransmit the low power-wakeup signal if the wakeup signal feedback indicates that the user device has not received the wakeup signal or if no wakeup signal feedback has been received by the apparatus; and otherwise not retransmitting, or omit to retransmit, the low power-wakeup signal if the wakeup signal feedback indicates that the user device has received the wakeup signal.

Example 19. The apparatus of Example 18, wherein the instructions and the at least one processor further cause the apparatus to: wait, by the apparatus, a wakeup signal timeout period after the transmitting the low power-wakeup signal; and transmit, by the apparatus to the user device, control information and data, after the wakeup signal timeout period.

Example 20. The apparatus of any of Examples 18-19, wherein the wakeup signal feedback is comprised in a Hybrid ARQ (HARQ) Acknowledgement (HARQ ACK) feedback that acknowledges receipt of the data, and thereby indirectly or implicitly also acknowledges receipt by the user device of the low power-wakeup signal.

Example 21. The apparatus of any of Examples 18-20, wherein the wakeup signal feedback comprises: a wakeup signal acknowledgement (WUS-ACK) to acknowledge receipt of the low power-wakeup signal; and a Hybrid ARQ (HARQ) Negative Acknowledgement (HARQ NACK) feedback that indicates that data was not received by the user device.

Example 22. The apparatus of Example 21, wherein the instructions and the at least one processor further cause the apparatus to: omit to retransmit, or not retransmit, to the user device, the low power-wakeup signal based on receiving the wakeup signal acknowledgement; and retransmit, to the user device, the data, based on receiving the HARQ NACK for the data.

Example 23. The apparatus of any of Examples 18-22, wherein the wakeup signal feedback further comprises additional information associated with the detection of low power-wakeup signals by the user device.

Example 24. The apparatus of Example 23, wherein the additional information comprises at least one of: a power adjustment request to request a power adjustment of the low power-wakeup signal; a time adjustment request to request adjustment of the wakeup signal timeout period between transmission by the network node of the low power-wakeup signal and transmission by the network node of at least one of control information or data to the user device; or a request to deactivate transmission by the network node of the low power-wakeup signal; or a request to adjust a modulation and coding scheme used by the network node for the transmission of the low power-wakeup signal.

Example 25. The apparatus of any of Examples 18-24, wherein the instructions and the at least one processor further cause the apparatus to: receive, by the apparatus from the user device, a wakeup signal negative acknowledgement (WUS-NACK) that indicates that the user device did not receive the low power-wakeup signal.

Example 26. A method comprising: transmitting, by a network node to a user device, a low power-wakeup signal, to cause a low power-wakeup receiver of the user device to enable a main transceiver of the user device; determining, by the network node, whether the network node has received from the user device, wakeup signal feedback indicating whether the user device has received the low power-wakeup signal; retransmitting, by the network node, the low power-wakeup signal if the wakeup signal feedback indicates that the user device has not received the wakeup signal or if no wakeup signal feedback has been received by the network node; and otherwise not retransmitting, or omitting to retransmit, the low power-wakeup signal if the wakeup signal feedback indicates that the user device has received the wakeup signal.

Example 27. The method of Example 26, further comprising: waiting, by the network node, a wakeup signal timeout period after the transmitting the low power-wakeup signal; and transmit, by the apparatus to the user device, control information and data, after the wakeup signal timeout period.

Example 28. The method of any of Examples 26-27, wherein the wakeup signal feedback is comprised in a Hybrid ARQ (HARQ) Acknowledgement (HARQ ACK) feedback that acknowledges receipt of the data, and thereby indirectly or implicitly also acknowledges receipt by the user device of the low power-wakeup signal.

Example 29. The method of any of Examples 26-28, wherein the wakeup signal feedback comprises: a wakeup signal acknowledgement (WUS-ACK) to acknowledge receipt of the low power-wakeup signal; and a Hybrid ARQ (HARQ) Negative Acknowledgement (HARQ NACK) feedback that indicates that data was not received by the user device.

Example 30. The method of Example 29, further comprising: omitting to retransmit, or not retransmitting, to the user device, the low power-wakeup signal based on receiving the wakeup signal acknowledgement; and retransmit, to the user device, the data, based on receiving the HARQ NACK for the data.

Example 31. The method of any of Examples 26-30, wherein the wakeup signal feedback further comprises additional information associated with the detection of low power-wakeup signals by the user device.

Example 32. The method of Example 31, wherein the additional information comprises at least one of: a power adjustment request to request a power adjustment of the low power-wakeup signal; a time adjustment request to request adjustment of the wakeup signal timeout period between transmission by the network node of the low power-wakeup signal and transmission by the network node of at least one of control information or data to the user device; or a request to deactivate transmission by the network node of the low power-wakeup signal; or a request to adjust a modulation and coding scheme used by the network node for the transmission of the low power-wakeup signal.

Example 33. The method of any of Examples 26-32, further comprising: receiving, by the network node from the user device, a wakeup signal negative acknowledgement (WUS-NACK) that indicates that the user device did not receive the low power-wakeup signal.

Example 34. An apparatus comprising means for performing the method of any of Examples 26-33.

Figure 11:
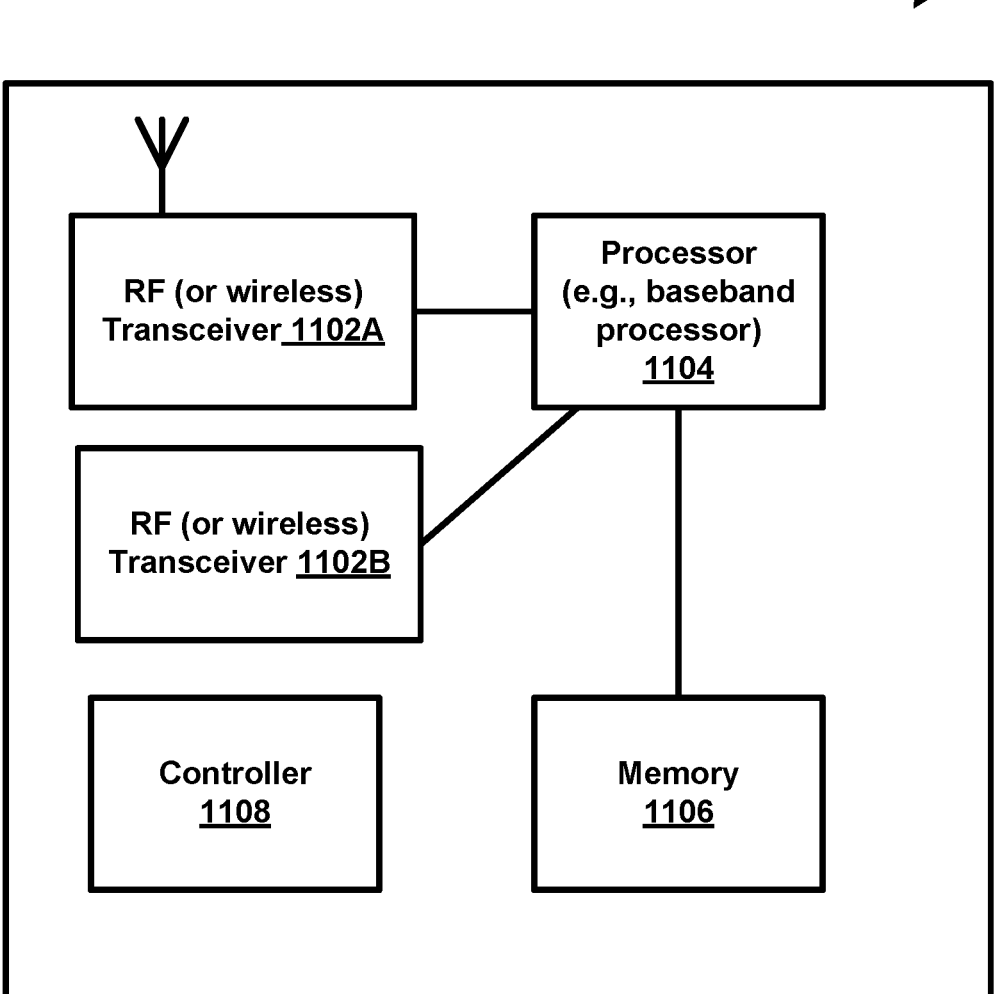
FIG. 11 is a block diagram of a node or wireless station (e.g., base station/access point, relay node, or mobile station/user device) according to an example implementation.

FIG. 11 is a block diagram of a wireless station (e.g., AP, BS, e/gNB, NB-IoT UE, UE or user device) 1100 according to an example implementation. The wireless station 1100 may include, for example, one or multiple RF (radio frequency) or wireless transceivers 1102A, 1102B, where each wireless transceiver includes a transmitter to transmit signals (or data) and a receiver to receive signals (or data). The wireless station also includes a processor or control unit/entity (controller) 1104 to execute instructions or software and control transmission and receptions of signals, and a memory 1106 to store data and/or instructions. The wireless station as an apparatus or an apparatus (such as a processor/ controller/chipset) inside the wireless station may perform one or more of steps described in connection of e.g., FIGS. 3-10.

Processor 1104 may also make decisions or determinations, generate slots, subframes, packets or messages for transmission, decode received slots, subframes, packets or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 (1102A or 1102B) together may be considered as a wireless transmitter/receiver system, for example.

In addition, referring to FIG. 11, a controller (or processor) 1108 may execute software and instructions, and may provide overall control for the station 1100, and may provide control for other systems not shown in FIG. 11 such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

According to another example implementation, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes, or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. A method in a New Radio (NR) system operating with a subcarrier spacing of 30 kHz, the method comprising:
   detecting, by a wakeup receiver of a user device, a wakeup signal by a transmitted in a slot number three of a frame by a network node, wherein the wakeup receiver is a hardware-distinct circuit structurally distinct from a main transceiver of the user device and configured to consume less power than the main transceiver and being incapable of decoding Physical Downlink Control Channel (PDCCH) and Physical Downlink Shared Channel (PDSCH);
   enabling, by the wakeup receiver, the main transceiver of the user device based on the detecting the wakeup signal, the enabling including a ramp-up delay of 2 milliseconds before the main transceiver becomes fully active; and
   transmitting, by the main transceiver of the user device in a first uplink slot immediately following the ramp-up a one-bit wakeup signal acknowledgement (WUS-ACK) on a Physical Uplink Control Channel (PUCCH) that explicitly acknowledges a detection of the wakeup signal,
   wherein the wakeup signal feedback further comprises:
      additional information associated with the detection of wakeup signals by the user device, and
      exactly one additional bit, multiplexed with the WUS-ACK, that requests a time adjustment of a wakeup signal-to-downlink control information (WUS-to-DCI) interval, additional bit being set to increase the WUS-to-DCI interval or to decrease the WUS-to-DCI interval.

2. The method of claim 1, further comprising:
   receiving, by the user device from the network node, at least one of downlink control information or data via the main transceiver; and
   transmitting a Hybrid ARQ (HARQ) Acknowledgement (HARQ ACK) feedback that acknowledges receipt of at least one of the downlink control information or the data, wherein the wakeup signal feedback is implicitly comprised in the HARQ ACK.

3. The method of claim 2, wherein the additional information comprises:
   a request to deactivate transmission by the network node of the wakeup signal;
   a request to adjust a modulation and coding scheme used by the network node for the transmission of the wakeup signal;
   a power adjustment request to request a power adjustment of the wakeup signal; and
   a time adjustment request to request adjustment of a time period between transmission by the network node of the wakeup signal and transmission by the network node of at least one of control information and/or data to the user device.

4. An apparatus, comprising:
   a wakeup receiver;
   a main transceiver;
   at least one processor; and
   at least one memory storing instructions that, when executed by the at least one processor, cause the apparatus at least to:
      detect, by the wakeup receiver, a wakeup signal transmitted in a slot number three of a frame from a network node, wherein the wakeup receiver is a hardware-distinct circuit structurally distinct from the main transceiver of the apparatus and configured to consume less power than the main transceiver and being incapable of decoding Physical Downlink Control Channel (PDCCH) and Physical Downlink Shared Channel (PDSCH);
      enable, by the wakeup receiver, the main transceiver based on the detecting the wakeup signal, the enabling including a ramp-up delay of 2 milliseconds before the main transceiver becomes fully active; and
      transmit, by the main transceiver in a first uplink slot immediately following the ramp-up, a one-bit wakeup signal acknowledgement (WUS-ACK) on a Physical Uplink Control Channel (PUCCH)—that explicitly acknowledges a detection of the wakeup signal,
      wherein the wakeup signal feedback further comprises:
         additional information associated with the detection of wakeup signals by the apparatus, and
         exactly one-additional bit, multiplexed with the WUS-ACK, that requests a time adjustment of a wakeup signal-to-downlink control information (WUS-to-DCI) interval, the additional bit being set to increase the WUS-to-DCI interval or to decrease the WUS-to-DCI interval.

5. The apparatus of claim 4, wherein the apparatus is further caused to:
   receive, from the network node, at least one of downlink control information or data via the main transceiver; and
   transmit, via the main transceiver, a Hybrid ARQ (HARQ) Acknowledgement (HARQ ACK) feedback that acknowledges receipt of at least one of the downlink control information or the data, wherein the wakeup signal feedback is implicitly comprised in the HARQ ACK.

6. The apparatus of claim 4, wherein the apparatus is further caused to:
   fail to receive data by the main transceiver after being enabled; and
   wherein the wakeup signal feedback comprises:
   the WUS-ACK to acknowledge receipt of the wakeup signal; and
   Hybrid ARQ (HARQ) Negative Acknowledgement (HARQ NACK) feedback that indicates that the data was not received by the apparatus.

7. The apparatus of claim 6, wherein the apparatus is further caused to:
   receive, by the main transceiver, the data that was retransmitted by the network node based on the HARQ NACK feedback, without the apparatus detecting or receiving another wakeup signal.

8. The apparatus of claim 7, wherein the additional information comprises:
   a request to deactivate transmission by the network node of the wakeup signal; and
   a request to adjust a modulation and coding scheme used by the network node for the transmission of the wakeup signal.

9. The apparatus of claim 8, wherein the additional information comprises:
   a power adjustment request to request a power adjustment of the wakeup signal.

10. The apparatus of claim 9, wherein the additional information comprises:
   a time adjustment request to request adjustment of a time period between transmission by the network node of the wakeup signal and transmission by the network node of at least one of control information or data to the apparatus.

* * * * *